Oct. 11, 1966     A. G. BRUNS     3,277,881
COMBINED TABLE FOR COOKING AND EATING
Filed Jan. 25, 1965
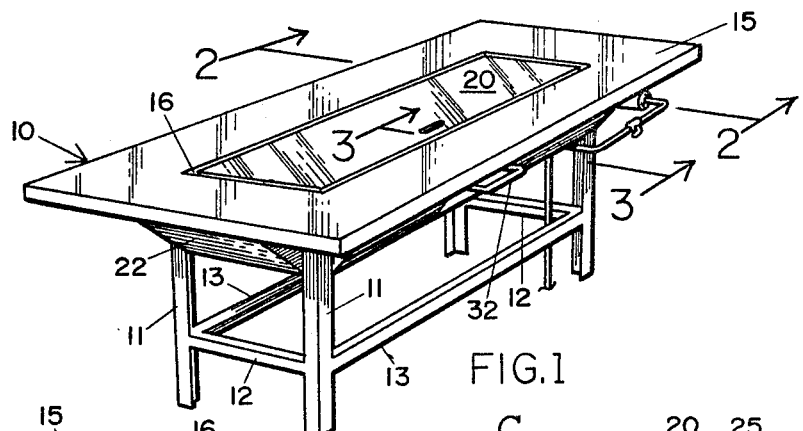
FIG. 1
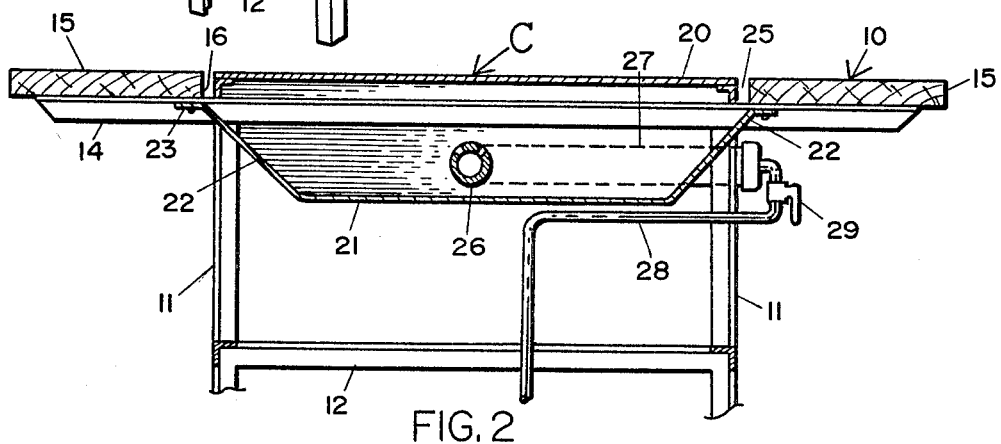
FIG. 2
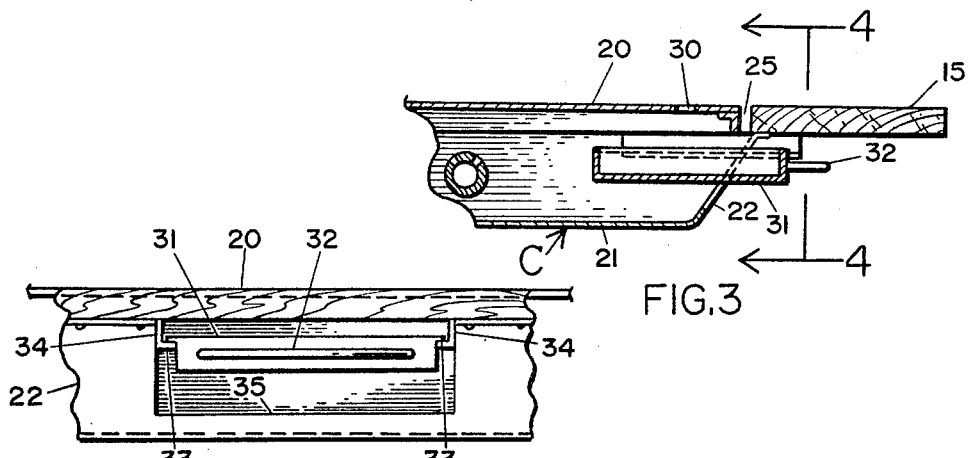
FIG. 3
FIG. 4
*INVENTOR*
ARTHUR G. BRUNS
BY
Salvatore G. Militano
attorney

United States Patent Office 3,277,881
Patented Oct. 11, 1966

3,277,881
COMBINED TABLE FOR COOKING AND EATING
Arthur G. Bruns, 627 Eldron Drive, Miami Springs, Fla.
Filed Jan. 25, 1965, Ser. No. 427,728
3 Claims. (Cl. 126—40)

This invention relates to tables but is more particularly directed to a table that has the double function of cooking and eating purposes.

A principal object of the present invention is to provide a combined table for the purpose of cooking and eating simultaneously without subjecting the persons that are eating at the table to the intense heat being utilized for cooking purposes.

Another object of the present invention is to provide a table at whose central portion are cooking facilities so that as people are seated about the table for eating purposes, the central portion may be used for cooking purposes.

A further object of the present invention is to provide a combined table for eating and cooking purposes wherein a slotted portion is formed between the cooking portion and the eating portion of the table for the dispersion of heat generated by the cooking portion of the table.

A still further object of the present invention is to provide a combined table for cooking and eating purpose wherein the cooking portion of the table is provided with a removable tray and a slotted portion for disposing refuse through the slot and received by the tray.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

FIGURE 1 is a perspective view of a combined table for cooking and eating purposes constructed in accordance with my invention.

FIGURE 2 is a cross sectional view taken along the line 2—2 of FIGURE 1.

FIGURE 3 is a fragmentary cross sectional view taken along the line 3—3 of FIGURE 1.

FIGURE 4 is a similar view taken along the line 4—4 of FIGURE 3.

Referring to the drawing wherein like numerals are used to designate similar parts throughout the several views the numeral 10 refers to my combined eating and cooking table consisting of a support frame having a plurality of upstanding legs 11. The legs 11 are secured at their lower portion by horizontal braces 12 and 13, at their top portion there extends table top supporting members 14. The members 14 support a rectangular shaped table top 15 having a rectangular shaped opening 16 at its mid-portion. The table top 15 functions as the eating portion of my table 10 about which people will sit and partake of the food cooked on the cooking portion C of my table 10.

The cooking portion C of my table 10 is positioned within the opening 16 and consists of a steel plate member 20 mounted on and otherwise secured to the top portion of the support legs 11 as best shown by FIGURE 2. Mounted beneath the steel plate member 20 is a shallow pan consisting of a bottom wall 21 inclined side walls 22 at the upper edges of which are flanges 23 fastened to the support members 14 and the inner edges of the table top 15. Note that this construction forms a peripheral slot 25 about the steel plate top 20 that permits the escape of heat generated by the cooking portion C of my table 10. Within the pan 20 is a gas burner element 26 which extends the full length of the steel plate member 20 and is connected at one end to a gas pipe 27 that extends along the outside surface of the pan side wall 22 and secured to one of the legs 11. A further gas pipe 28 connected at one end to a source of gas not shown is connected at its other end to the gas pipe 27 with a shut-off valve 29 mounted thereon to control the flow of gas therethrough. The burner element 26 is provided with two rows of openings for the escape of gas whereby two rows of flame are formed to heat the cooking plate 20.

The steel plate member 20 is provided with a slot 30 for receiving scraps of food, grease, etc. that are collected in a tray 31 removably positioned therebelow. The tray 31 which is provided with a handle 32 is slidably positioned on a flange portion 33 of angle irons 34 horizontally positioned below the steel plate 20. The tray 31 and the support angle irons 34 extend through an opening 35 formed in the side wall 22 at the mid-portion thereof.

From the construction of my table 10 as described hereinabove taken in connection with the drawing, after the gas burner 26 has been lighted, the steel plate member 20 will become heated and food placed thereon will be cooked. While the food is being cooked or shortly thereafter, persons can be seated about the table top 15 and utilize the table top 15 for eating purposes. All of the refuse, grease, etc. can be disposed by discarding them through the slot 30 and accumulated in the tray 31. The heat generated by the cooking portion C of my table 10 will be permitted to escape through the slot 25 which extends about the inner periphery of the table top 15 and thereby prevent the people sitting about the table from being uncomfortable due to being subjected to excessive heat.

Although my table 10 was shown and described as using gas for cooking purposes, it is readily noted that electricity or any other means of cooking may be utilized if desired.

Having disclosed my invention, what I claim as new and desire to secure by Letters Patent of the United States is:

1. A combined table for cooking and eating comprising a table top having a substantially centrally disposed opening and forming a substantial eating space peripherally disposed about said opening, a plurality of upstanding leg portions supporting said table top, cooking means mounted in said opening and supported on said leg portions, said cooking means having a metallic plate member positioned in said opening and in spaced relation to the inner periphery of said table top forming a slotted portion for the discharge of heat therethrough, said metallic plate having a slot and removable tray means mounted in said cooking means below said slot in said metallic plate member for receiving material disposed through said slot.

2. A combined table for cooking and eating comprising a plurality of upstanding legs, brace members extending between said legs, a plurality of horizontally disposed members secured to top portions of said legs and extending beyond said legs, a table top mounted on said horizontally disposed members, said table top having a substantially centrally disposed opening, a pan mounted in said opening below the surface of said table top, said pan having flange portions at its perimeter engaging a lower surface of said table top, a metallic plate member mounted in said opening above said pan forming a heating chamber, said metallic plate member being spaced from inner edges of said table top thereby forming a slotted portion for the discharge of heat therethrough, heat generating means mounted in said heating chamber, said metallic plate member having a slot, and removable tray means mounted in said pan below said last named slot for receiving refuse disposed through said slot.

3. A combined table for cooking and eating comprising a plurality of upstanding legs, brace members extending between said legs, a plurality of horizontally disposed members secured to top portions of said legs and extending beyond said legs, a table top mounted on said horizontally disposed members, said table top having a substantially centrally disposed opening, a pan mounted in said opening below the surface of said table top, said pan having flange portions at its perimeter engaging a lower surface of said table top, a metallic plate member mounted in said opening above said pan forming a heating chamber, said metallic plate member being spaced from inner edges of said table top thereby forming a slotted portion for the discharge of heat therethrough, a burner mounted substantially longitudinally in said heating chamber at the mid-portion thereof, said burner having a pair of rows of openings extending diagonally toward said metallic plate member, pipe means connecting said burner, valve means mounted in said pipe means, a slot in said metallic plate member, and removable tray means mounted in said pan below said last named slot for receiving refuse disposed through said slot.

References Cited by the Examiner
UNITED STATES PATENTS

| | | | |
|---|---|---|---|
| D. 131,939 | 4/1942 | Robinson | 126—25 X |
| 668,902 | 2/1901 | Beyer | 126—40 |
| 1,582,346 | 4/1926 | Oster | 312—236 |
| 1,706,365 | 3/1929 | Riley | 126—40 X |
| 2,362,757 | 11/1944 | Lang | 126—21 X |

FREDERICK L. MATTESON, JR., *Primary Examiner.*

E. G. FAVORS, *Assistant Examiner.*